Sept. 19, 1933.   R. G. FLEMING   1,927,281
HARVESTER
Filed Nov. 8, 1928
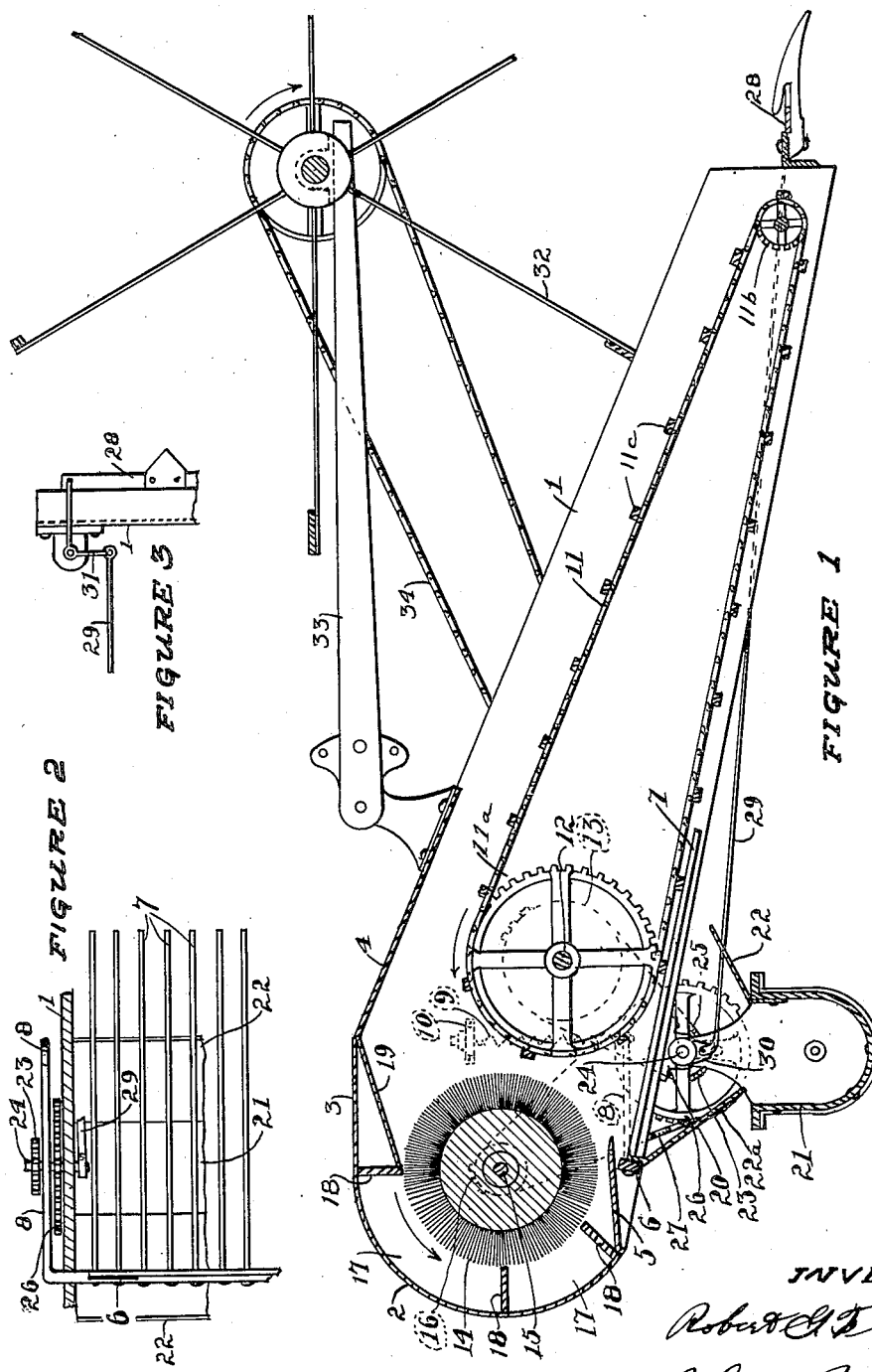
INVENTOR
Robert G. Fleming
John A. Naismith
ATTORNEY Patented Sept. 19, 1933

1,927,281

UNITED STATES PATENT OFFICE 1,927,281

HARVESTER

Robert G. Fleming, Chico, Calif., assignor to Guy H. Hall, Evanston, Ill.

Application November 8, 1928. Serial No. 317,942

6 Claims. (Cl. 130—27)

This invention relates particularly to that portion of a harvester by means of which the grain, seeds, or similar valuable parts are separated from the stalks or sustaining parts.

It is one object of the invention to provide a separating mechanism that will be thorough in operation, positive in action.

It is another object of the invention to provide a separating mechanism of the character indicated that will be light in weight, economical to manufacture, of few parts, and highly efficient in its practical application.

In the drawing:

Figure 1 is a longitudinal, vertical section through a separating embodying my invention, parts broken away.

Figure 2 is a detail plan view of a portion of the rack over which the material is discharged, a portion of the supporting frame being shown in section.

Figure 3 is a detail illustration of a portion of the sickle and operating mechanism therefor.

Referring now more particularly to the drawing, I show at 1 the general frame which supports the carrier belt and threshing means hereinafter described. The forward end of this frame is open but the rear end is closed by a semi-cylindrical casing 2 which flattens out at the top as at 3 and then extends forwardly in the plane of the upper edge of sides of the frame as shown at 4 to form a hood over the working parts as shown. The lower portion of this end casing 2 terminates in a forwardly and upwardly directed lip 5.

Immediately under the lip 5 is a transversely positioned bar 6 having a plurality of spaced and parallel forwardly directed fingers 7 mounted therein. These fingers are normally held in a raised position within the frame by means of a crank 8 mounted on the bar exteriorly of the frame and to which is connected a spring 9 connected to a lug 10 mounted on the frame above the crank as shown.

The endless carrier belt mechanism 11 may be of any suitable type passing over rollers 11ª and 11ᵇ, with a suitable degree of tension, the belt being actuated by the roller 11ª which is driven through the medium of a shaft 12 and sprocket 13.

At 14 is shown a cylindrical brush mounted in spaced relation to casing 2 and slightly spaced from carrier 11 and driven by a shaft 15 and sprocket 16. Radially mounted in casing 2 to form pockets 17 are baffle plates 18 so proportioned as to closely approach the periphery of the brush 14. A guide plate is inserted at 19 to direct material between the adjacent baffle plate and the brush.

Suspended below the frame 1 as by hangers 20 is a trough 21 fitted with extension plate 22. This trough is situated directly below the fingers 7 and so positioned as to catch all of the grain or seeds that drop through the said fingers, a plate 22ª being disposed in position to receive any grain that might otherwise drop to the rear of the trough 21 and to deflect such grain into the trough. For purposes referred to hereinafter, the grain deflecting plate 22ª is carried by the bar 6 on which the fingers 7, constituting an open rack, are mounted. The conveyor for removing the seed or grain from the trough is not shown.

It is desired that the brush 14 rotate at high speed relative to the carrier 11, and this desired result is obtained by driving the sprocket 13 from a relatively small sprocket 23 on a drive shaft 24 through the medium of chain 25, and driving the relatively small sprocket 16 from a larger sprocket 26 on shaft 24 through the medium of chain 27, the carrier and brush being rotated in the direction indicated by the arrows.

Mounted on the forward end of frame 1 is a conventional form of reciprocating sickle or cutter as 28. In the present case, this cutter is actuated by means of a pitman 29 eccentrically pivoted on a crank 30 on shaft 24 and connected to the cutter by means of a bell-crank 31 mounted on frame 1. A spider 32 is supported on frame 1 by an arm 33 and is driven by means of a sprocket and chain connection 34 to a shaft, not shown.

Assuming that the structure described has been properly assembled and mounted in the usual manner so that a continual feed of cut grain is thrown on to the carrier belt 11, its action is as follows.

As the material spread over the belt is carried over to the brush 14 it is picked up by the rapidly revolving brush and carried under the top baffle plate 18 and into the first pocket 17. In passing under the plate 18 the material is forced into the brush but as it passes the plate the centrifugal force developed by the brush throws it outwardly into the pocket 17. This action is repeated as the material passes the two following baffle plates and consequently it is thoroughly churned and the grain or seeds completely separated from the stalks or vines as the case may be. As the material is carried past the last plate it strikes the lip 5 and is again thrown against the brush and then outwardly against the carrier 11 where it falls down upon the fingers 7. Here the grain or seed drops through into the trough 21 while the rest of the material is carried forward over the fingers by the carrier 11 and discharged upon the ground. The resilient mounting of the fingers permits collected bunches of material to pass over the fingers.

It will be observed that by means of this construction the loose grain carried upwardly on the belt may drop directly through to the trough without passing through the pockets, but the loose stalks and vines cannot drop through because they are picked up by the rapidly revolving brush.

I have found that if the part 11a is made of several spaced rollers of small diameter, considerable difficulty is encountered because of the fact that the stalks and weeds and material of that nature will wind about them and so interfere materially with the efficiency of the machine. By making the part 11b of small diameter and the part 11a of substantially the same diameter as the brush 14 the desired movement of the material is secured without difficulty and at considerable less mechanical complication.

It is obvious that when the machine is in motion and material is being fed from the threshing mechanism to the separator mechanism, the fingers 7 forming a part of the threshing mechanism will be in a constant state of vibration through the constant passage thereover of the cleats 11c with which the carrier is provided. These cleats cooperate with the spring 9 to impart the vibration referred to. As will be apparent, the plate 22a receives the grain dropping between the fingers and directs it into the trough 21. The vibration of the separator is of course imparted to this plate whereby accumulation of grain on the plate is effectually prevented.

It is to be understood, of course, that while I have herein shown and described but one specific embodiment of the invention, changes in form, construction, and method of assembly and operation may be made within the scope of the appended claims.

I claim:

1. In a harvester, a casing, a cylindrical brush revolubly mounted therein in spaced relation thereto, baffle plates inserted between the casing and brush to form pockets in which the material treated may be churned, the inner edges of said baffles being closely related to the periphery of the brush so that the ends of the brush elements engage the material that passes between the inner edges of the baffles and the ends of the brush elements.

2. In a harvester, a casing, a cylindrical brush revolubly mounted therein in spaced relation thereto, baffle plates inserted between the casing and brush to form pockets in which the material treated may be churned, the inner edges of said baffles being closely related to the periphery of the brush so that the ends of the brush elements engage the material that passes between the inner edges of the baffles and the ends of the brush elements, and a conveyor operatively mounted to feed material to be separated to the brush.

3. In a harvester, a casing, a cylindrical brush revolubly mounted therein in spaced relation thereto, radially positioned baffle plates mounted on the inner side of the casing longitudinally of the brush and directed toward the same to form pockets, in which the material treated may be churned, the inner edges of said baffle plates being closely related to the periphery of the brush so that the ends of the brush elements may engage the material that passes between the inner edges of the baffle plates and the ends of the brush elements.

4. In a harvester, a casing, a cylindrical brush revolubly mounted therein in spaced relation thereto, radially positioned baffle plates mounted on the inner side of the casing longitudinally of the brush and directed toward the same to form pockets, in which the material treated may be churned, the inner edges of said baffle plates being closely related to the periphery of the brush so that the ends of the brush elements may engage the material that passes between the inner edges of the baffle plates and the ends of the brush elements, and means for feeding material to the brush.

5. In a threshing machine, the combination of a rotary cylindrical brush, two spaced apart baffle devices each having its inner edge close to the periphery of the brush for directing material toward and temporarily holding it in the path of the brush, and a casing spaced apart from the brush and extending from one baffle device to the other and forming a pocket of such size and shape as to receive and retard grains or the smaller particles of material being operated upon until said material is forced by the second baffle device and the action of the brush into and through the space between the brush and the second baffle device.

6. In a threshing machine, the combination of a rotary cylindrical brush, two spaced apart baffle devices each having its inner edge close to the periphery of the brush for directing material toward and temporarily holding it in the path of the brush, a casing spaced apart from the brush and extending from one baffle device to the other and forming a pocket of such size and shape as to receive and retard grains or the smaller particles of material being operated upon until said material is forced by the second baffle device and the action of the brush into and through the space between the brush and the second baffle device, and means for directing material to be threshed into the space between the first baffle device and the brush.

ROBERT G. FLEMING.